Oct. 16, 1962 R. T. CATLIN ET AL 3,058,115
CAPTIVE PISTON STUD DRIVER
Filed Jan. 23, 1958 2 Sheets-Sheet 1

INVENTORS
ROBERT T. CATLIN
JOHN CLARKE SINEX
BY
ATTORNEYS

Oct. 16, 1962  R. T. CATLIN ET AL  3,058,115
CAPTIVE PISTON STUD DRIVER
Filed Jan. 23, 1958  2 Sheets-Sheet 2
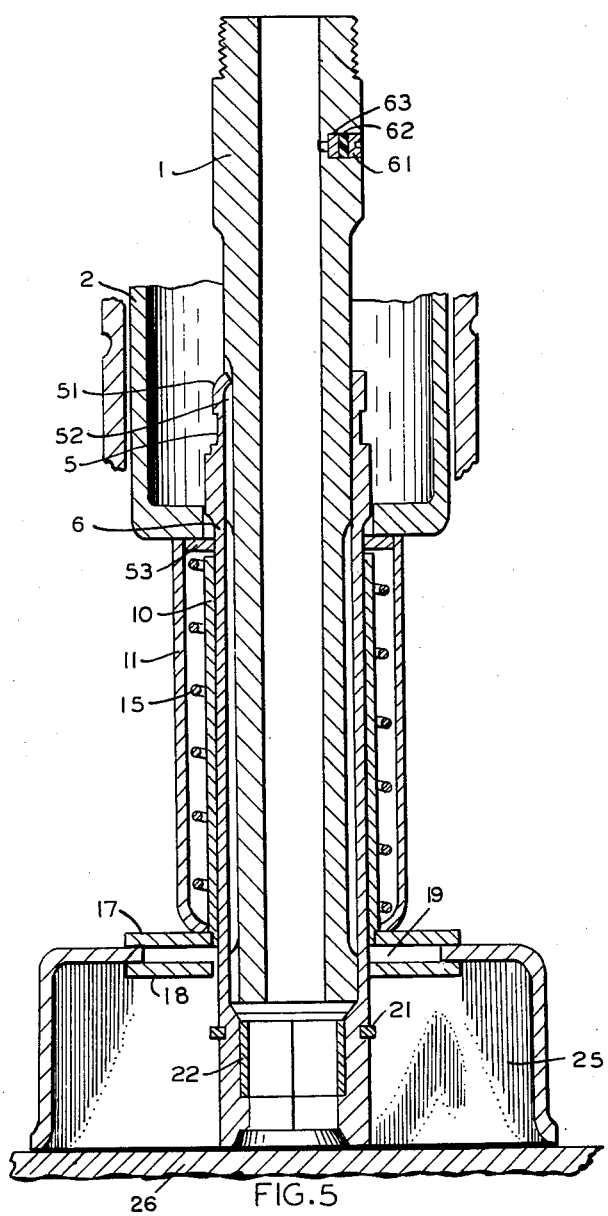
FIG.3
FIG.4
FIG.5
INVENTORS
ROBERT T. CATLIN
JOHN CLARKE SINEX
BY 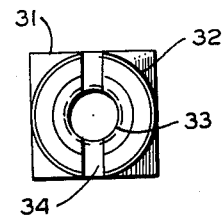
ATTORNEYS United States Patent Office 3,058,115
Patented Oct. 16, 1962

3,058,115
CAPTIVE PISTON STUD DRIVER
Robert T. Catlin, Trumbull, Conn., and John Clarke Sinex, Ilion, N.Y., assignors to Remington Arms Company, Inc., Bridgeport, Conn., a corporation of Delaware
Filed Jan. 23, 1958, Ser. No. 710,817
6 Claims. (Cl. 1—44.5)

This invention relates generally to the field of stud driving tools of the type which project fastener studs or pins by means of the forces resulting from the combustion of propellant powder of an explosive cartridge contained in the tool. Such tools generally are well known in the art. The improvement of the instant invention, however, is more specifically directed to a particular type of stud driver such as is disclosed in the pending patent application of Robert T. Catlin and John Clarke Sinex, Serial No. 574,677, filed March 29, 1956, of which this application is a continuation-in-part. In this type of tool there is provided a piston member positioned in the bore of the barrel between the propellant-containing cartridge and the stud. The piston is connected to the stud and is so constructed that the piston cannot leave the stud driver barrel completely upon firing of the cartridge because of interfering and abutting stop structure of both the stud driver barrel extension or guide tube and the piston. Since the stud is connected to the piston, the stud cannot escape completely from the stud driver barrel extension either. Means are provided for quick detachment of the piston from the muzzle end of the barrel and for the detachment of the fastener from the piston.

The object of this invention is to greatly improve the operation of this type of stud driver as to the number of steps and effort required after a "no-load" shot is fired. A "no-load" shot is said to occur when this stud driver is fired against a workpiece having extremely light resistance or no resistance to penetration by the stud. Such an occurrence causes the "captive stud" features of this type stud driver to be brought into play to prevent the possibility of a free flying stud under the "no-load" conditions. When the "no-load" shot occurs, the piston to which the stud is attached embeds itself in a buffer element which acts between the interfering structural stop portions of the stud driver barrel extension and the stud-carrying piston. The occurrence of the "no-load" shot requires that the stud driver tool be partly disassembled in order that the piston may be separated from the buffer element and the mutilated buffer element replaced. Due to the construction of the earlier versions of the piston type stud driver it was necessary to actually disassemble the barrel element itself which was usually to be accomplished only by a distributor or at the factory. In the event that the user himself attempted the task of disassembly it was possible that the tool would be reassembled in such a manner that the safety feature of the captive piston would be inoperative. This not only was somewhat time consuming but resulted in the likelihood of the creation of an undesirable condition as to the safety features.

It is an object of this invention to provide an improved stud driver structure which provides a captive piston and stud type of operation, allows quick and simple disassembly for separation of the piston and buffer after a "no-load" shot, allows expeditious replacement of the buffer element, and provides for reassembly of the tool in a manner which positively insures the operation of the captive piston safety feature even if a replacement buffer is inadvertently omitted.

The objects of the invention are accomplished generally by providing a detachable guard element which cooperates with the muzzle end of the stud driver to prevent flying fragments from the work surface upon entry of the fastener, which guard element also carries, as an important feature thereof, abutment means and a buffer which prevents free flight of the piston and projected stud when insufficient work resistance is encountered to stop the stud-piston assembly. The guard element and stud driver barrel are provided with aligning means which insures that the buffer and abutment means are operative at all times to prevent complete escape of the piston and stud from the tool when the guard and stud driver are assembled for use.

The exact nature of the invention as well as other objects and advantages thereof will become clear from consideration of the following specification and attached drawings in which:

FIG. 3 is a side elevation of the captive piston which is sued with the particular stud driver shown in FIG. 1.

FIG. 4 is a bottom end view of the captive piston shown in FIG. 3, showing the recess into which the head of the stud is connected or threaded.

FIG. 5 is an enlarged longitudinal sectional view with parts of the upper housing broken away to show clearly the relationship of the barrel and associated guard assembly.

Figure 1:
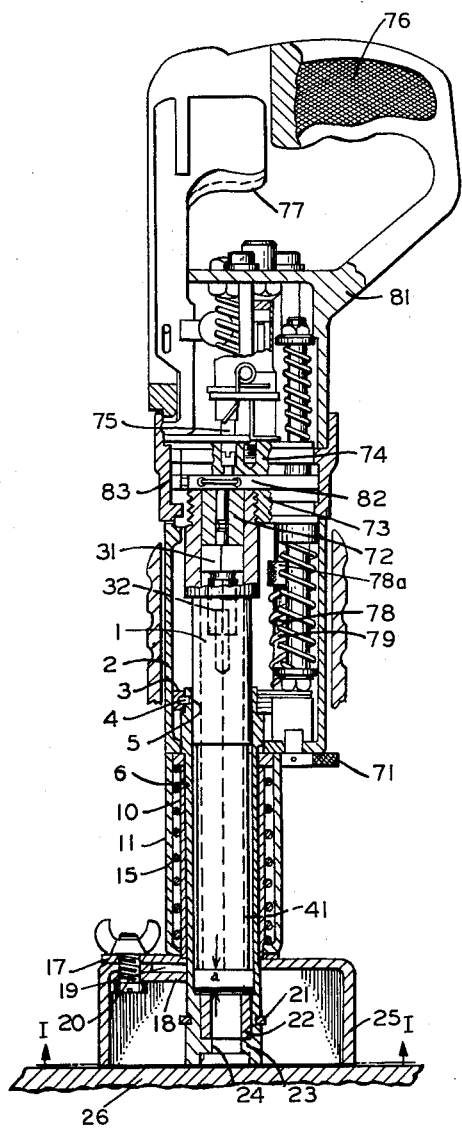
FIG. 1 is a longitudinal sectional view through a portion of a stud driver embodying the invention.
Figure 2:
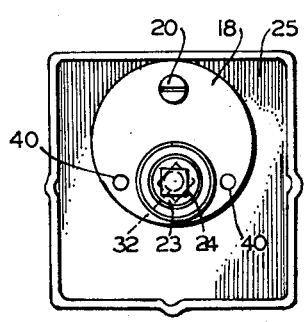
FIG. 2 is a transverse end view of the stud driver barrel and guard structure taken at line I—I.

Referring to the drawings by reference numerals, we have illustrated by elements 2, 3, and 4, parts of stud driver tools such as that disclosed in the copending patent application of Merle H. Walker, Newton M. Reed, and Robert T. Catlin, Serial No. 517,192, filed June 22, 1955, and entitled "Powder Actuated Tool." The upper portion of the tool as shown in FIG. 1, except for the barrel cross-section and aligning means 51 and 52 for the barrel and guide tube 6, is the same as that disclosed in detail in the above-mentioned patent application Serial No. 517,192. Briefly and generally, the construction, arrangement of parts, and operation of parts is set forth as follows: The barrel 1 is fastened by being screwed into frame plate 73. A cover 2 of cylindrical configuration surrounds the rear portion of the barrel and part of the operating mechanism, and abuts frame plate 73 being secured thereto by bolts 78. In the breech end of the barrel is fitted a chamber bushing 72 which contains the blank cartridge propellant at the time of firing. The chamber bushing is connected to a chamber plate 82 mounted on casing member 83. The chamber bushing is backed up by breech block element 74. Casing member 83 and handle unit 81 enclose the breech closing mechanism and firing mechanism which is actuated by trigger element 77 when the necessary work surface pressure is transmitted to the firing mechanism via a casing tube such as 6 and connected elements including element 3. The cover 2, casing member 83, and handle unit 81 can be relatively manipulated by twisting and withdrawing grip 76 to (a) withdraw the chamber bushing 72 from the breech end of the barrel; to (b) permit loading of the fastener device and piston; to (c) uncover the breech end of the firing bushing so that the spent propellant cartridge may be removed and a fresh cartridge loaded therein; and to (d) re-position these parts in operative position for firing the cartridge which will propel the stud and piston through the bore 41 of the barrel against a workpiece. The barrel element 1 is of a type similar to stud driver barrels as illustrated in this copending application except for the inwardly lanced portion 51 on the upper surface of the guide tube 6 which slidingly engages an axially disposed slot in the outer surface of the barrel 1, as shown in FIG. 5, and the non-circular cross-section of the bore 41 of the barrel as illustrated in FIG. 2.

The stud driver barrel 1 has supported around it in slidable relation the cylindrical guide tube or barrel extension tube 6. The guide tube 6 and guard structure associated therewith are attached to the conventional stud driver in the usual manner; that is, by forcing the upper end of the guide tube 6, as shown in FIG. 1, into the opening in stud driver housing 2 around the barrel 1 until the resilient snap ring 4 in the action bar plate 3 engages in the annular groove 5 in the upper end of the guide tube 6. FIG. 1 shows the barrel 1 and housing 2 in operative attached position with respect to guide tube 6 and the associated guard structure and in the position occupied when the stud driver is held in operative position against a work surface 26. The guide tube 6 and its associated guard structure are attached to the stud driver tool, with snap ring 4 in engagement with annular groove 5 and the lower or muzzle end of the barrel 1 adjacent the upper surface of buffer element 22 but spaced therefrom a given distance, which distance is lessened when the stud driver is in operative engagement with a work surface 26. In addition, lanced portion 51 of the upper end of guide tube 6 will be in engagement with the axial slot shown in the outer barrel surface to prevent relative rotational movement between the barrel and the guide tube.

Guide tube 6 has slidably mounted upon it for limited axial movement a double concentric tube assembly consisting of a cylindrical element 10 fixed by suitable means, to an outer cylindrical element 11. The circular plate element 17, attached to outer cylindrical elements 10 and 11 and a second circular plate element 18, are arranged in concentrical relation overlying one another and connected by rivets 40, the center of each element being laterally spaced from the axis of the respective concentric tubes to permit limited lateral movement of the barrel in the guard 25. The overlying circular elements 17 and 18 are positioned one outside and one inside of an eccentrically placed circular opening 19 in the box-like guard structure 25 and secured in position by a bolt 20 and wingnut as shown in FIG. 1. Although guide tube 6 is mounted for slidable axial movement in the housing 2, it is urged toward the outer limits of its movement therein by the helical spring 79 acting between a nut 78a on one of the cover bolts 78 and the slidable action bar plate 3. Similarly, the helical spring 15 acting between the flange 53 on the upper end of the guide tube 6 and the intersection of the tubes 10 and 11 acts to extend thee assembly of the tubes 10 and 11 and thee related guard structure relative to the tube 6. An annular stop abutment 21 on the guide 6 serves to limit the amount of extension of the guard structure. As noted, however, the parts are shown in the position they would occupy after the guard 25 has been placed in contact with a work surface 26 and the stud driver handle 76 has been advanced relative thereto to compress both the spring 15 and the spring 79 and position the parts of the tool in readiness for firing as explained in the copending application referred to herein.

The lower end of guide tube 6 is provided with a radially inwardly projecting annular flange 23, the inner surface of which defines a non-circular aperture 24 identical in configuration and slightly smaller in size to the cross-section of the bore of barrel 1, shown to be square in the preferred embodiment of the drawings. Positioned inside the bottom of guide tube 6 fitted to the inner portion thereof is a buffer element 22 of relatively easily deformable material such as aluminum or copper. Buffer element 22 abuts the inwardly projecting flange 23 and has formed therethrough a passageway of cross-section matching the aperture 24 of the end of guide tube 6. The passageway in buffer 22 and the matching aligned aperture 24 are rotationally positioned relative to the non-circular bore of barrel element 1, by means of lanced portion 51 and its slot, so that there is misalignment and partial blocking of the bore of the barrel. Preferably, the alignment is that of two equal square cross-sections, one of which is rotated through an angle of forty-five degrees about the axis of the bore or concentric guide tube. This relationship is clearly illustrated in FIG. 2. An annular stop abutment 21 is secured on the periphery of the lower portion of guide tube 6 and serves to limit the amount of extension of the guard 25 resulting from expansion of the spring 15.

The piston which carries the stud during projection by the propellant gases is shown in FIG. 3 and consists of a rearward portion 31 of cross-section closely fitted to that of the bore of the barrel 1 and a forward portion of reduced cross-section 32 into which the stud to be fired is inserted and held, preferably by an interiorly threaded portion 33 of an axial passageway through the piston. Radial ports 35 connect the inner surface of the axial passageway to the outer surface of the piston. A slot 34 is provided in the forward end of the piston which enables application of a hack saw blade to the end of studs which may break off in the piston to expedite their removal with a screwdriver.

In order to operate the tool and project fastener studs into a desired work surface, the stud driver with attached guard is placed in operative position over the spot in the work surface 26 into which it is desired to project a stud. Next, a suitable stud is attached to the piston and the piston with the attached stud inserted in the breech end of the stud driver barrel (as shown in FIG. 1). The piston is held in position in the breech end of the barrel by frictional engagement with a resiliently backed piston 63 which projects into the bore (FIG. 5). The resilient backing element is shown at 62 and held in place by machine screw 61. A propellant cartridge is placed in the firing chamber in the chamber bushing behind the piston, and the tool actuated to fire the cartridge in the manner well known to the art. Normally, sufficient resistance is provided by the work surface 26 into which the stud fastener is projected to stop the stud and piston before the portion of the piston which is fitted to the barrel bore engages or impacts the edges of the relatively misaligned (by forty-five degrees) buffer element supported by the inner surface of flange 23 in the end of guide tube 6.

After firing the fastener stud into the work surface, it must be disconnected from the tool and from the piston. The piston and stud are disconnected from the tool by lifting the stud driver away from the work surface and rotating the tool 45° about the barrel axis and withdrawing the tool. This rotary movement is permitted by the increased axial spacing between the end of the barrel 1 and the upper surface of the buffer 22 which exists when the stud driver is lifted away from the work surface 26 and the springs 15 and 79 are permitted to expand, bringing the plate 18 into engagement with the stop 21 and the action bar plate 3 into engagement with the end of the housing 2. This spacing is indicated at "a" in FIG. 1 prior to expansion of the springs. Then the piston is disconnected from the stud by unscrewing the interengaging threaded portions. However, should the tool be fired against a work surface of very light resistance or no resistance at all, the corners of the square piston will be stopped by impact with the interfering edge portions of the relatively misaligned or rotated edges of the aperture through buffer element 22 and flange 23. The necessary degree of misalignment to insure the desired interference or stop surface is controlled and insured by the alignment of lanced portion 51 on the upper end of guide tube 6 with the slot in the upper end of the barrel 1 and with the square aperture 24 in the lower end of guide tube 6 and the buffer element.

After an instance of firing the tool against a very light resistance or no resistance at all, the piston 32 will be found embedded in the buffer element 22. It is necessary that both the piston and stub be removed from the guide tube 6 so that they may be separated and a new buffer disk substituted for the one multilated by the effects of the "no-load" shot. With our disclosed structure this operation may be carried out quickly and easily. The stud driver and barrel are withdrawn from the guide tube 6 after the snap ring 4 has been released from the groove 5 in the upper end of guide tube 6 by actuating lever 71. An example of this actuating means is disclosed and fully described in the previously mentioned pending application of Merle H. Walker, Newton M. Reed, and Robert T. Catlin, entitled "Powder-Actuated Tool," Serial Number 517,192, filed June 22, 1955.

After separating the guard assembly from the remainder of the stud driver the buffer element 22 with the piston 32 embedded therein can easily be removed from the guide tube 6 by driving them out of the upper end of the guide tube 6 by a series of light impacts or blows upon the inverted guide tube or directly upon the piston or the buffer.

It is a characteristic of the stud driver tools to be used with this invention, an example of such tool being disclosed in the above-referenced copending patent application of Merle H. Walker et al., Serial No. 517,192, that the firing mechanism thereof cannot be actuated until the tool and guard assembly are held in operative position against a work surface. This is accomplished by the pressure on the handle 76 holding the guard assembly against the work surface with sufficient force to compress the springs 15 and bring the end of the guide tube 6 into engagement with the work surface 26 and then to move the casing 2 forward relative to the guide tube 6 and plate 3 a distance sufficient to prepare the mechanism for firing.

When used with these type tools, the guide tube 6 performs the same function in supporting the element 3 relative to the work surface 26 while the stud driver is moved forward relative to the work surface. Therefore, it can be understood that the firing mechanism of the tool cannot be actuated when the guard assembly is detached therefrom. This is a desirable result in safety of operation.

Although a variety of modifications has not been shown, it is believed to be apparent that there are other embodiments which, within the meaning of the following claims, can be considered to be equivalents. For an exact definition of the limits of our invention, reference is made to the following claims.

We claim:

1. An explosive-operated tool including a barrel member having a bore through which a driven unit can be explosively projected at a high velocity toward the muzzle end thereof, said driven unit comprising a piston member and a fastener device positively and releasably connected thereto, guide means positioned adjacent said barrel muzzle and slidable thereon along the longitudinal axis thereof, said guide means having an outer portion extending outwardly of said barrel, means releasably mounting an inner portion of said guide means on said barrel member, an opening in said guide outer portion contiguous but misaligned with said barrel bore, stop means on said guide outer portion constructed to permit said fastener device to pass through said guide means a predetermined distance and then limit passage of said piston member, buffer means positioned against said stop means in said guide outer portion to absorb impact caused by using said tool on a material with insufficient penetration resistance, and means interacting between said guide means and said barrel to prevent mounting of said guide means on said barrel except when said buffer and stop means are properly oriented relative to said barrel to prevent said driven unit from escaping from said tool.

2. A device as recited in claim 1 wherein said barrel bore and a head on said piston member are of non-circular configuration, the cross-sectional area of said barrel bore being slightly greater than the area of said piston head so that said head moves in close proximity to the walls of said barrel bore, non-circular aligned openings in said buffer and said stop means, of similar shape and approximate area as said bore, oriented in such manner to be misalinged with said non-circular barrel bore, whereby upon being explosively projected, said fastener device will pass through said non-circular bore and openings until stopped by either a penetration resistant material or upon impact of said non-circular piston head against said buffer means.

3. A device as recited in claim 1 and including a shield means slidable on and operatively connected to said guide means whereby said shield means and said guide means can be quickly mounted on or removed from said barrel as a unit.

4. A device as recited in claim 1 wherein said interacting means which insure proper orientation of said buffer and stop means comprises a projecting means on said guide means and a slot means on said barrel member in which said projecting means moves.

5. A device as recited in claim 1 in which means are provided to force said guide means outer portion and said buffer means a predetermined distance away from the muzzle end of said barrel, the space thus vacated being sufficient to permit relative rotational movement of said tool and said piston head when said driven unit is fastened and it is desired to remove the tool from said driven unit.

6. A device as recited in claim 1 in which said buffer means is made of permanently deformable material.

References Cited in the file of this patent

UNITED STATES PATENTS

| 2,767,398 | Pfaff et al. | Oct. 23, 1956 |
| 2,925,602 | Kopf et al. | Feb. 23, 1960 |

FOREIGN PATENTS

| 167,800 | Great Britain | Aug. 29, 1956 |
| 178,075 | Austria | Apr. 10, 1954 |
| 211,642 | France | Dec. 22, 1956 |
| 540,621 | Belgium | Feb. 17, 1956 |
| 1,000,749 | Germany | Jan. 10, 1957 |
| 1,117,509 | France | Feb. 27, 1956 |